United States Patent
Yoshino

[11] Patent Number: 5,261,982
[45] Date of Patent: Nov. 16, 1993

[54] METHOD OF MANUFACTURING A HEAT INSULATION PIPE BODY

[75] Inventor: Akira Yoshino, Osaka, Japan

[73] Assignee: Daidousanso Co., Ltd., Osaka, Japan

[21] Appl. No.: 818,083

[22] Filed: Jan. 8, 1992

[51] Int. Cl.$^5$ .............. B05D 1/10; B05D 1/08
[52] U.S. Cl. .................. 156/191; 156/195; 427/223; 264/80
[58] Field of Search .......... 156/191, 195, 155; 427/423; 264/80; 29/458

[56] References Cited

U.S. PATENT DOCUMENTS

| | | |
|---|---|---|
| 2,291,823 | 8/1942 | Mickelson et al. |
| 3,005,742 | 10/1961 | Kennedy. |
| 3,401,073 | 9/1968 | Wood. |
| 3,906,769 | 9/1975 | Maslowski ............... 427/423 X |
| 4,099,481 | 7/1978 | Lyons ..................... 427/423 X |
| 4,713,284 | 12/1987 | Hasegawa et al. ........ 427/423 X |
| 4,839,239 | 6/1989 | Ducos et al. ............. 427/423 X |
| 5,045,365 | 9/1991 | Okano et al. ............. 427/423 |

FOREIGN PATENT DOCUMENTS 887345 1/1962 United Kingdom.

*Primary Examiner*—Jeff H. Aftergut
*Attorney, Agent, or Firm*—Armstrong, Westerman, Hattori, McLeland & Naughton

[57] ABSTRACT

Stainless steel foil 31 is wound spirally on the circumference of a pipe body 30 from one end to another end of the pipe body 30 to overlap itself and the periphery of the pipe body 30 is covered with the overlapped layer to give a heat insulation pipe body. The stainless steel foil 31 is wound on the circumference of the pipe body 30 from one end thereof, while ceramic particles 32 are flame sprayed to the wound part of the stainless steel foil 31 to form a ceramic particle dotted layer 33. Then on the periphery of the stainless steel foil 31 with the ceramic particle dotted layer 33 formed, a part of the stainless steel foil subsequent to one end of said stainless steel foil is wound shiftedly toward an axis direction and at the same time the newly wound stainless steel foil part is flame sprayed with ceramic particles 32 to form a ceramic particle dotted layer 33 and these steps are repeated.

1 Claim, 2 Drawing Sheets

METHOD OF MANUFACTURING A HEAT INSULATION PIPE BODY

TECHNICAL FIELD

This invention relates to a method of manufacturing a heat insulation pipe body.

PRIOR ART

A heat insulation pipe body is used for various heat insulation pipings. For example, a vacuum thermal insulation duplex pipe is used for a liquid transferring pipe and the like through which fluid with ultra low temperature such as liquid nitrogen is transferred. As an internal pipe for the heat insulation duplex pipe, the heat insulated pipe body is applied. On the periphery of such a pipe body, strip aluminum foil and Dexter paper (asbestos paper) are wound alternately in a multi-layered state. Generally it is manufactured as follows. Aluminum foil and Dexter paper are firstly wound on the circumference of a pipe body overlappedly into two layers. A plurality of the overlapped portions of the two portions are formed on the circumference of the pipe body for covering the pipe body with them to give a heat insulation pipe body.

However, if the above-mentioned insulation pipe body is manufactured under a high moisture atmosphere, the Dexter paper becomes highly water rich by absorbing water content in air during winding since the paper used as an insulator of the insulation pipe body has a high water absorption property. Accordingly, there is a disadvantage that when the clearance or space between an internal pipe and external pipe is evacuated into vacuum in the process of manufacturing the vacuum heat insulation duplex pipe, the water content becomes a resistance in evacuation and it takes a long time to evacuate.

The inventor of the present invention proposed a heat insulator wherein a ceramic particle scattered layer is formed on one side of metallic foil, instead of a conventional heat insulator comprising aluminium foil and the Dexter paper, in order to exclude water absorption property of heat insulator. It was filed as a Japanese Utility Model Application No. 2-106483 and U.S. patent application Ser. No. 771,988. A thermal insulation pipe body using the heat insulator is manufactured in the following manner. Ceramic particles are scattered on the surface of one side of metallic foil by flame spraying to form a thermal insulator, and the thermal insulator is wound and overlapped on the circumference of a pipe body as well as the conventional one to cover the circumference of the pipe body with this overlapped layer. However, in this manner, since it is required to scatter ceramic particles on a surface of the metallic foil by flame spraying prior to overlapping the insulator on peripheral surface of the pipe body, it is impossible to perform a series of operations such as scattering the ceramic particles and overlapping the ceramic particle scattered metallic foil on the circumference of the pipe body subsequently and to produce the insulation pipe body continuously. Therefore, development of a method for manufacturing the heat insulation pipe body continuously is desired strongly.

OBJECT OF THE INVENTION

Accordingly, an object of the invention is to provide a method in which a thermal insulation pipe body can be manufactured continuously.

SUMMARY OF THE INVENTION

To accomplish the object, the method of manufacturing heat insulation pipe body according to the invention comprising steps of overlapping a pipe body with strip metallic foil spirally on its peripheral surface from one end to another end of the pipe body to cover the periphery of the pipe body with the overlapped layer of the strip metallic foil, and further characterized in that while the strip metallic foil is wound on the circumference of the pipe body from one end of the foil, ceramic particles are flame sprayed on the wound part to form a ceramic particle scattered layer, that a part of strip metallic foil subsequent to said one end of the strip metallic foil is wound shiftedly in an axis direction on the circumference of the strip metallic foil with the ceramic particles scattered layer formed, that at the same time ceramic particles are flame sprayed on the newly wound part of the strip metallic foil to form a ceramic particle scattered layer again, and that the above-mentioned steps are repeated to make the ceramic particle scattered layer exist between each wound layer of the spirally overlapped strip metallic foil.

That is, in the method according to the invention, winding of the strip metallic foil on the circumference of the pipe body and forming of the ceramic particle dotted layer on the surface of the strip metallic foil can be done simultaneously because while said strip metallic foil is wound on the circumference of the pipe body from one end of the foil, ceramic particles are flame sprayed on the wound part to form ceramic particle scattered layer. A part of metallic foil subsequent to said one end of the strip metallic foil is wound shiftedly in an axis direction on the circumference of the strip metallic foil with the ceramic particle scattered layer formed and at the same time ceramic particles are flame sprayed on the newly wound part of the strip metallic foil to form a ceramic particle scattered layer. These steps are repeated to overlap predetermined turns or rolls of the ceramic scattered metallic foil having the ceramic particle scattered layer therebetween. In this way, it is possible to wind ceramic particle sprayed metallic foil predetermined turns or rolls on the circumference of a pipe body flame-spraying ceramic particles and winding metallic foil simultaneously. Accordingly, it is possible to manufacture an insulation pipe body continuously.

The present invention is described in detail.

In the method of manufacturing an insulation pipe body according to the present invention, a pipe body, strip metallic foil and ceramic particles formed by flame spraying are mainly used.

As the pipe body, various cylindrical articles such as a metallic piping, a synthetic resin piping and a synthetic resin piping of which the surface is metal-sputtered or plated are used.

The strip metallic foil wound on the pipe body is not limited particularly. Various kinds of metallic foil may be used. Thickness thereof is set at 5 to 1000 $\mu$m, preferably 10 to 100 $\mu$m, more preferably 5 to 30 $\mu$m. Among the various kinds of metallic foil, one having high fusion temperature and good radiant efficiency, such as particularly stainless steel foil, copper foil or nickel foil, brings good results when used.

As the above-mentioned ceramic particles, particles of ceramic material such as forsterite ($2MgO \cdot SiO_2$), magnesia (MgO) and alumina ($Al_2O_3$) are used. They are used alone or in combination. The ceramic particle is formed, in fact, by flame spraying raw material of the ceramic particle on the circumference of the strip metallic foil. Each ceramic particle formed is applied on the circumference of the metallic foil with some intervals from an adjacent ceramic particle. Diameter of thus formed ceramic particle is generally about 5 to 50 $\mu$m, whereby thickness of the ceramic particle dotted layer formed on the strip metallic foil by flame spraying ceramic particles is about the same as the diameter. Interval between each particle is set at about 10 to 2000 $\mu$m. Preferably diameter of the ceramic particle is 5 to 30 $\mu$m and the interval between each particle is set at 10 to 200 $\mu$m.

A heat insulation pipe body is manufactured using the above-mentioned materials as follows, for example. A metallic foil wound part is flame sprayed with ceramic particles by a conventionally known flame spray gun winding the strip metallic foil on the circumference of a pipe body from one end of the metallic foil to form a ceramic particle dotted layer. Furthermore, overlapping the strip metallic foil shifting it little by little in an axis direction of the pipe body, ceramic particles are flame sprayed on the wound part to form a ceramic particle dotted layer newly and continuously. By repeating winding of strip metallic foil and forming of the ceramic particle scattered layer on the wound part, a heat insulation layer with required rolls wound on the circumference of the pipe body (comprising the strip metallic foil overlapped spirally and the ceramic particle dotted layer formed between each wound layer) is formed. Thus the heat insulation pipe body can be manufactured continuously.

This invention is described based on example.

EXAMPLE

Figure 1:
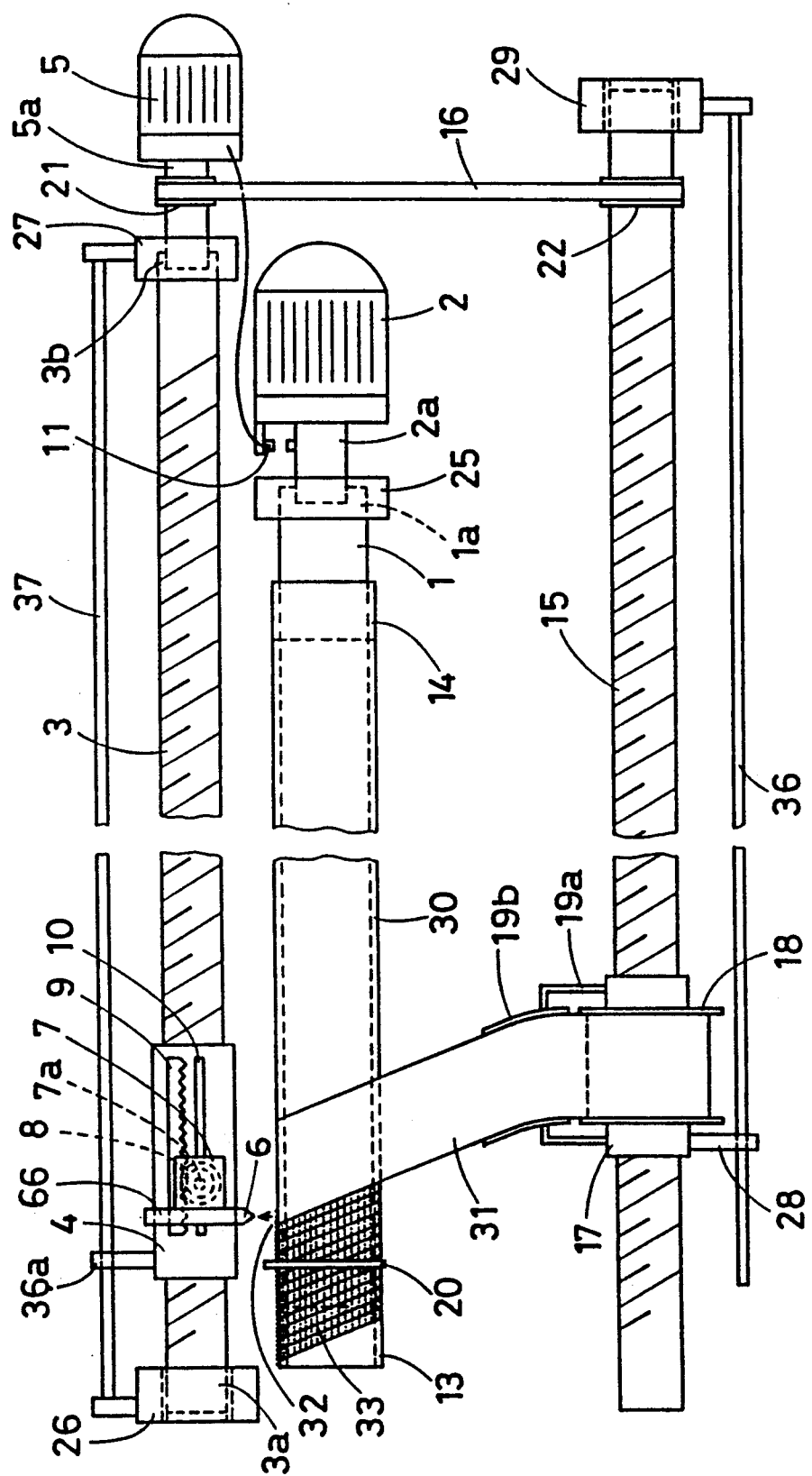
FIG. 1 shows an explanatory view shown an example of this invention illustrating a state in which the whole is watched from upward.

FIG. 1 shows an example of this invention. In the figure, the reference numeral 1 is a mandrel for fitting in and fixing a pipe body 30. In one side of the mandrel 1 a first tapped or screw axis 15 having stainless steel foil reel 18 is employed and in another side a second tapped or screw axis 3 disposed with a flame spray nozzle 6 is employed.

The pipe body 30 is removably fitted on the circumference of the mandrel 1. A left ring body (a left dummy body) 13 is disposed adjacent to the left end of the pipe body 30 and a right ring body (a right dummy body) 14 is disposed adjacent to the right end of the pipe body 30. Both ring bodies 13, 14 are fitted removably on the mandrel 1. Motor 2 is fixed on a bottom and an output axis 2a of the motor 2 is connected to a right end part 1a of the mandrel 1 with a connecting member 25 to rotate the mandrel 1.

The first tapped axis 15 located at one side of the mandrel 1 is rotatably supported at its one end with a supporting base 29. Receiving rotating power of a motor 5 for rotating the second tapped axis 3 with a belt 16, the first tapped axis 15 is rotated. The reference numerals 21, 22 are pulleys. A reel supporter 17 is disposed movably along the first tapped axis 15 with a screw mechanism. Describing in more detail, a first guiding arm part 28 having a sliding opening (hidden and not seen) is protruded on the reel supporter 17. A first guiding bar 36 extending along the first tapped axis 15 from the supporter 29 is inserted into the sliding opening. Because of this, rotating of the reel supporter 17 together with the first tapped axis 15 is prevented and the reel supporter 17 moves along the first tapped axis 15 by the rotation of the axis 15. A reel 18 on which stainless steel foil 31 having width of 300 mm is wound is rotatably and removably fitted on the circumference of the reel supporter 17. In this case, a nail body (hidden and not seen) for braking is disposed on the circumference. The nail body performs a braking action by press-contacting an inside circumference of a cylindrical part of the reel 18 to provide resistance when pulling out the stainless steel foil 31. A supporting part 19a in a shape like "]" is protruded on the reel supporter 17 to support and fix a flat plate guiding part 19b. Projected lines are formed on both sides of the guiding part 19b to perform an action for transferring drawn stainless steel foil 31 drawn from the reel 18 obliquely toward a direction of the mandrel 1, whereby the stainless steel foil 31 is wound on the circumference of the pipe body 30 and right and left ring bodies 13, 14 fitted on the mandrel 1 with inclined angle of the guide part 19b. A left end part 3a of the second tapped axis 3 located at another side of the mandrel 1 is rotatably supported by a supporter 26 and a right end part 3b is connected to and supported by an output axis 5a of the motor 5 with a supporter 27. The second tapped axis 3 is disposed with a flame spraying gun supporter 4 so that the nozzle supporter 4 can move along the second tapped axis 3 with a screw mechanism. A second guiding arm part 36a having an slidable opening (hidden and not seen) is protruded on the flame spray gun supporter 4, whereby a second guiding bar 37 fixed with left and right supporters 26, 27 is penetrated into the hole. With this structure, corotation of the second tapped axis 3 and the flame spray gun supporter 4 is prevented and the flame spray gun supporter 4 moves along the second tapped axis 3 by the rotation of the second axis 3. An accommodation case 7 in which a motor (hidden and not seen) is accommodated in upward state is disposed on the flame spray gun supporter 4 so that it is movable along the longitudinal direction of the flame spray gun supporter 4. A flame spray gun 66 having a flame spray nozzle 6 is applied to the case 7 as shown in the figure. Describing in detail, a guide bar (hidden and not shown) is hanged from the below of the case 7 and the bar is engaged with a guide groove 10 disposed longitudinally on the spray gun supporter 4. Stepped portions are formed longitudinally on left and right wall surface in the guide groove 10 and below end projection of the guide bar is engaged with the step portion to prevent slipping off. A pinion 8 is fixed at the output axis 7a of the motor accommodated upward in the case 7 to be engaged with a rack 9 disposed longitudinally at the flame spray gun supporter 4. The motor is arranged to repeat a normal rotation and reverse rotation at a certain period. Therefore, when the motor is started, the pinion 8 repeats normal rotation and reverse rotation alternately via the output axis 7a, whereby the case 7 having a the motor therein moves along the rack 9 reciprocatedly in right and left direction at a certain period.

A control section of the motor 5 driving the second tapped axis 3 is electrically connected with a sensor 11 disposed at the motor 2 for driving the mandrel 1 to rotate simultaneously with the motor 2.

Figure 2:
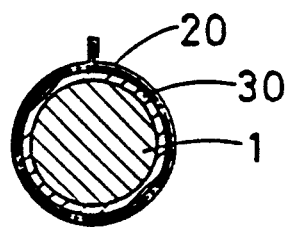
FIG. 2 shows a cross sectional view illustrating a state in which a band is used.

A heat insulation pipe body can be manufactured by a method mentioned below using such an apparatus. At first, a pipe body 30 is fitted on a mandrel 1 and right and left dummy ring body 13, 14 are also fitted on the mandrel 1. After winding stainless steel foil 31 around a reel 18, the reel 18 is disposed at a reel supporter 17 of a first screw axis 15. Then one end of the stainless steel foil 31 is drawn out of the reel 18 and is spot welded on circumference of the left dummy ring body 13. In that state, motors 2 and 5 are driven rotating and at the same time a motor for driving a flame spray nozzle 6 is started. The mandrel 1 is thereby rotated counterclockwise direction and with the rotating power, stainless steel foil 31 is drawn from the reel 18, at first, to wind on the circumference of the left dummy ring body 13 gradually. At this time, the flame spray nozzle 6 moves reciprocatedly left and right (scanned left and right) by the action of the motor of the case 7 so that the nozzle 6 crosses the wound part to flame spray ceramic particles 32 on the wound part scatteredly or dottedly. Because of this, a ceramic particle dotted layer 33 is formed. In this case, since a first tapped axis 15 is rotated by rotation of the motor 5 via a belt 16 and with the rotation, the reel supporter 17 is moved to right as shown little by little, stainless steel foil 31 is shifted little by little to an axis direction of the mandrel 1 (to a right direction as shown in the figure little by little). In order to correspond to the shifted winding, the flame spray gun supporter 4 disposed with the nozzle 6 moves to the axis direction complying with the shift to the axis direction of the stainless steel foil 31. The movement of the flame spray gun supporter 4 is done adequately because a control part of the motor 5 for driving the second tapped axis 3 receives output signals of a sensor 11 of the motor 2 for driving the mandrel 1 and the rotation of the motor 5 is controlled to thereby control rotation speed of the second tapped axis 3. In this way, the stainless steel foil 31 is wound on each circumferences of the left ring body 13, the pipe body 30, and the right ring body 14 in order, receiving flame spray of ceramic particles 32. In this case, winding or turn number of the foil 31 is set at 30. However, when the foil 31 is wound around the pipe body 30 directly, the winding number does not reach 30 at the left end (starting part of winding) of the pipe body 30 since the foil 31 is wound shiftedly and obliquely little by little. The same is caused at the right end (terminal part of winding) of the pipe body 30. Because of this, in this invention the dummy ring bodies 13, 14 are disposed at left and right of the pipe body 30, a part wound initially and a part wound finally of the foil 31 are arranged to position on the left and right ring bodies 13, 14. This allows for the wound foil 31 to make 30 turns of overlapped layer at any part of the pipe body 30. A band 20 for preventing unwinding is applied at predetermined interval as shown in FIG. 2 on the circumference of the stainless steel foil 31 wound on the whole pipe body 30 to fix the stainless foil 31. Then the wound layer of the foil 31 is cut at the borders of the pipe body 30 and dummy ring bodies 13 14 respectively, and the pipe body 30 covered with the overlapped layer of the stainless steel foil 31 is taken off the mandrel 1. Thus the objective heat insulation pipe body is obtained.

In the above-mentioned example, the mandrel 1 is fixed and the flame spray gun supporter 4 and the reel supporter 17 are moved, but it may be reversed. Dummy ring bodies are not necessarily used but may be preferred.

Figure 3:
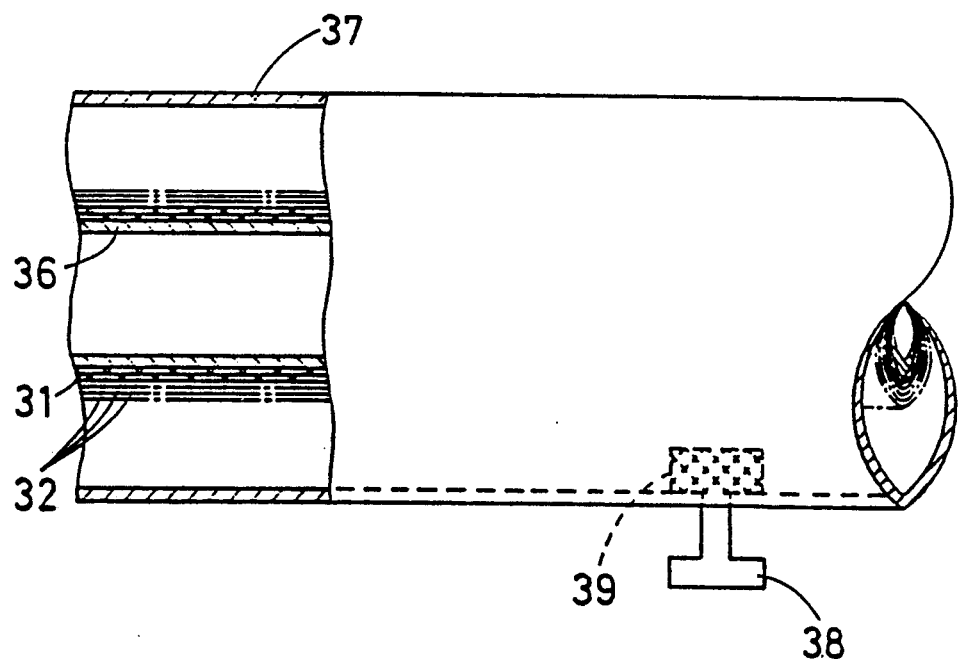
FIG. 3 shows a partial cross-sectional view showing structure of a vacuum heat insulation duplex pipe.

Using the heat insulation pipe body thus obtained, vacuum heat insulation dual pipe as shown in FIG. 3 can be manufactured as follows. That is, an external pipe 37 is fitted on the most outside layer of the heat insulation pipe body 36 with some space from the most outside layer and in that state, the space between the external pipe 37 and the insulation pipe body 36 is sealed. Then, the space is evacuated to high vacuum (less than $10^{-4}$ Torr) from an exhaust pipe 38. With this method, vacuum heat insulation duplex pipe can be manufactured. In the figure the reference numeral 39 is a filter disposed with the exhaust pipe 38.

EFFECTS OF THE INVENTION

As mentioned above, in the method of manufacturing an insulation pipe body according to the present invention, a metallic foil wound part is flame sprayed with ceramic particles to form a ceramic particle dotted layer winding the strip metallic foil on the circumference of a pipe body from one end of the metallic foil. So that winding of strip metallic foil on the periphery of the pipe body and forming ceramic particle scattered layer on the surface of one side of the strip metallic foil can be performed simultaneously. On the circumference of the metallic foil with ceramic particle scattered layer formed, a part of strip metallic foil subsequent to one end of the strip metallic foil mentioned previously is wound shiftedly to the axis direction and at the same time ceramic particles are flame sprayed to the newly wound part to form a ceramic particle scattered layer. These steps are repeated to overlap the strip metallic foil at required turns having the ceramic particle scattered layer therebetween. In this invention, it is possible to wind metallic foil flame sprayed with ceramic particles at required turns on the circumference of the pipe body with flame spraying ceramic particle and winding metallic foil simultaneously. Therefore, the insulation pipe body can be manufactured continuously.

What is claimed is:

1. A method of manufacturing a heat insulation pipe wherein a pipe body is spirally overlapped over its entire peripheral surface with a strip metallic foil comprising:

winding strip metallic foil around the circumference of the pipe body, in a helical pattern, beginning at one end of said body;

simultaneously applying ceramic particles to the wound strip metallic foil by flame spraying;

said helical winding being applied in a manner such that each winding overlaps at least a portion of a previous winding and optionally repeating the winding and flame spraying steps.

* * * * *